(12) United States Patent
Andrieu

(10) Patent No.: US 6,847,309 B2
(45) Date of Patent: Jan. 25, 2005

(54) IRREGULAR-POLE ENCODER FOR A POSITION SENSOR

(75) Inventor: Olivier Andrieu, Saint Maurice de Beynost (FR)

(73) Assignee: Electricfil Industrie, Beynost (FR)

( * ) Notice: Subject to any disclaimer, the term of this patent is extended or adjusted under 35 U.S.C. 154(b) by 242 days.

(21) Appl. No.: 10/197,210

(22) Filed: Jul. 18, 2002

(65) Prior Publication Data
US 2003/0116703 A1 Jun. 26, 2003

(30) Foreign Application Priority Data
Jul. 27, 2001 (FR) .............................. 01 10141

(51) Int. Cl.⁷ ................................................ H03M 1/22
(52) U.S. Cl. ........................................................ 341/15
(58) Field of Search ......................... 341/15; 381/165; 324/207.21; 505/166

(56) References Cited

U.S. PATENT DOCUMENTS

| 4,899,145 A | * | 2/1990 | Okuda et al. .................. 341/15 |
| 5,325,002 A | * | 6/1994 | Rabinowitz et al. ......... 505/166 |
| 5,568,048 A | * | 10/1996 | Schroeder et al. ...... 324/207.21 |
| 5,825,901 A | * | 10/1998 | Hisey .......................... 381/165 |

FOREIGN PATENT DOCUMENTS

| DE | 19800774 | 7/1999 |
| FR | 2757943 | 7/1998 |

* cited by examiner

*Primary Examiner*—Jean Bruner Jeanglaude
(74) *Attorney, Agent, or Firm*—Dennison, Schultz, Dougherty & MacDonald

(57) ABSTRACT

The disclosure concerns an encoder for a position sensor, the encoder having a multipole magnetic ring provided on its circumference with alternating north poles and south poles for traveling past a measurement cell that delivers a periodic signal corresponding to variation in the intensity of the magnetic field delivered by the poles.

15 Claims, 2 Drawing Sheets

IRREGULAR-POLE ENCODER FOR A POSITION SENSOR

FIELD OF THE INVENTION

The invention relates to the technical field of magnetic sensors comprising an encoder element that moves past a detector cell, such sensors being adapted to identify at least one angular position in the broad sense.

More particularly, the object of the invention is to provide an encoder fitted with a series of north poles and south poles that are mounted in alternating manner.

A particularly advantageous application of the invention lies in the automobile industry where such a sensor can be used, for example, in the context of ignition functions.

BACKGROUND OF THE INVENTION

In the above preferred field, it is known to use a magnetic sensor adapted to measure the change in the intensity of a magnetic induction field when a ferromagnetic encoder fitted with field-disturbing members moves past a detector cell. The detector cell such as Hall effect probe or a magneto-resistive probe, for example, delivers a periodic sinewave signal. The detector cell is associated with a level comparator exhibiting hysteresis, such as a Schmitt trigger, so as to obtain clean transitions in its output voltage for values of the magnetic induction that are distinct depending on whether it is increasing or decreasing.

In order to make a sensor for detecting a speed, it is known to provide an encoder having teeth that are disposed in regular manner and in large number so as to improve the resolution of such a sensor. A known improvement to that kind of sensor consists in making an encoder constituted by a multipole magnetic ring, having alternating north poles and south poles provided around its circumference and regularly spaced apart at a given pitch.

In order to determine at least one position, e.g. corresponding to ignition top dead-center for a cylinder, it is known to provide the magnetic encoder with a reference. Thus, it is known to omit e.g. two teeth from the toothed wheel. In the solution making use of an encoder with alternating north poles and south poles, it could be envisaged either to omit a plurality of magnetic poles, thereby leaving an empty space, or else to replace one or more poles of given sign with one or more poles of opposite sign. A pole having magnetization of one sign is thus provided between two adjacent poles of opposite sign, which pole presents a spacing that differs from the pitch at which the other poles are spaced.

In order to obtain good measurement accuracy, particularly concerning detection of the irregular pole, patent FR 2 757 943 teaches making an encoder which comprises, for each irregular pole, means for correcting the value of the magnetic field created by the irregular pole so that the signal delivered by the passage of the poles adjacent to said irregular pole is symmetrical about the null value of the magnetic field.

Implementing such an encoder makes it possible to obtain a magnetic signal at the output from the detector cell of the sensor having a period that is constant concerning the regular poles. As a result, measurements performed in this way are of good accuracy, in particular when identifying the irregular pole.

In an embodiment described in that patent, the means for correcting the value of the magnetic field of the irregular pole are formed by the thickness profile of said irregular pole.

Although the technical solution described in that patent gives satisfaction in practice, the Applicant has devised a way of improving such an encoder so as to make it easier to manufacture and so as to make detection possible in differential mode, in spite of the fact that the magnetic signal delivered by the irregular pole of the above-described encoder presents points of inflection.

OBJECTS AND SUMMARY OF THE INVENTION

The present invention thus seeks to remedy the drawbacks of the prior art by proposing an encoder possessing good accuracy in identifying the irregular pole while being designed so as to being simple to manufacture and so as to enable detection to be performed in differential mode.

To achieve such an object, the encoder for a position sensor in accordance with the invention is of the type comprising a multipole magnetic ring provided on its circumference with alternating north poles and south poles for traveling past a measurement cell that delivers a periodic signal corresponding to variation in the intensity of the magnetic field delivered by the poles, at least one of said poles of a determined sign being an "irregular" pole and comprising, between the two opposite-sign poles adjacent thereto, firstly a spacing that is different from the spacing pitch between the other poles, and secondly means for correcting the value of its magnetic field so that the magnetic signal delivered by the passage of the poles adjacent to said irregular pole is symmetrical about the null value of the magnetic field. In accordance with the invention, the correction means are made by defining at least the area of the irregular pole which is surrounded by a link pole between the adjacent poles and of the same sign as the adjacent poles, so that the component of the magnetic signal that is perpendicular to the surface of the encoder and that is generated during the passage of the poles adjacent to said irregular pole does not include a point of inflection.

According to an advantageous characteristic, the encoder is mounted on the crankshaft pulley so as to make it possible in particular to identify the ignition dead-center. According to another advantageous characteristic, the encoder is mounted on the cam pulley in order to identify the positions of the engine cylinders.

BRIEF DESCRIPTION OF THE DRAWINGS

Other characteristics appear from the following description given with reference to the accompanying drawings which show embodiments and implementations of the invention as non-limiting examples.

MORE DETAILED DESCRIPTION

Figure 1:
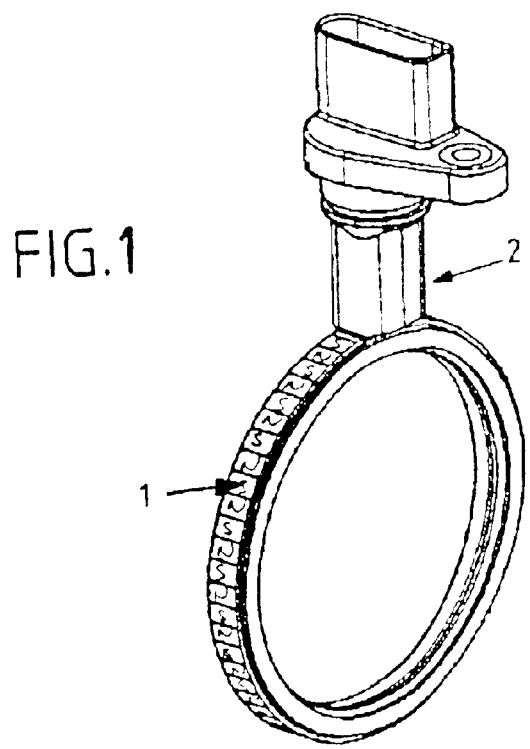
FIG. 1 is a general view showing an embodiment of an encoder of the invention.
Figure 2:
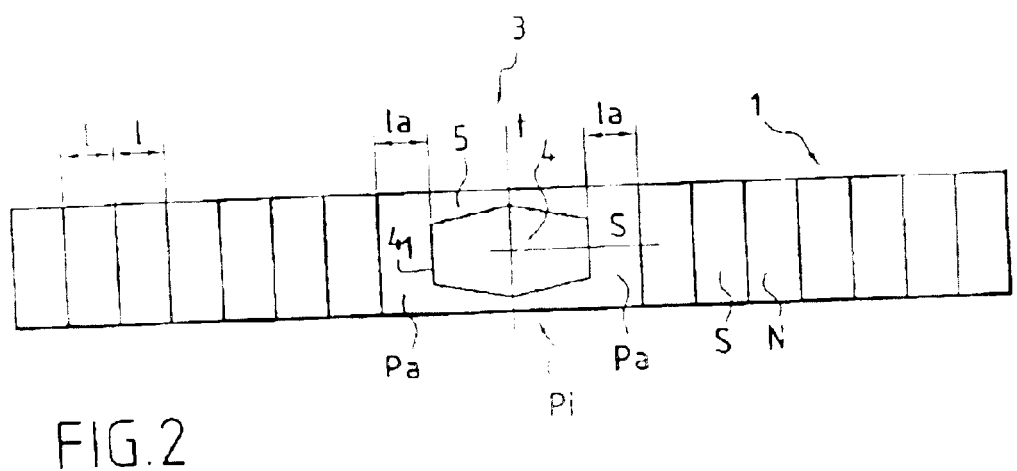
FIG. 2 is a developed view in a plane showing an embodiment of an encoder in accordance with the invention.

FIGS. 1 and 2 show an embodiment of a magnetic encoder 1 designed to travel past a detector cell 2 thus forming a position sensor. The encoder 1 is implemented in the form of a multipole magnetic ring rotated about its center and provided on its circumference with alternating north poles N and south poles S representing radial magnetization. In the example shown, the encoder 1 comprises a series of south poles S and north poles N that are arranged to present poles that are spaced at a regular pitch. For example, the angular extent of each pole can be 3°. In accordance with the invention, the encoder 1 also has at least one "Irregular" pole Pi presenting between the two poles Pa adjacent thereto a spacing that differs from the regular pitch spacing between the S and N poles. In the example shown, the irregular pole Pi has an angular width of 15° and constitutes a north pole, and the adjacent poles Pa of opposite sign are south poles. Naturally, the polarities of the adjacent poles Pa and of the irregular pole Pi could be inverted. By way of example, the encoder 1 is constituted by a ring constituting a support having bonded thereto a ring made of elastomer filled with magnetized particles to constitute the north and south poles.

In accordance with the invention, for each irregular pole Pi, the encoder 1 has means 3 for correcting or compensating the value of the magnetic induction field created by the irregular pole Pi relative to the value of the magnetic induction field created by the adjacent poles, so that the magnetic field created by the irregular pole does not influence the magnetic field created by the adjacent poles. Thus, the correction means 3 are designed so that the signal corresponding to variation in the intensity of the magnetic field as delivered by the poles adjacent to the irregular pole Pi is symmetrical about the null value of the magnetic field.

Figure 3:
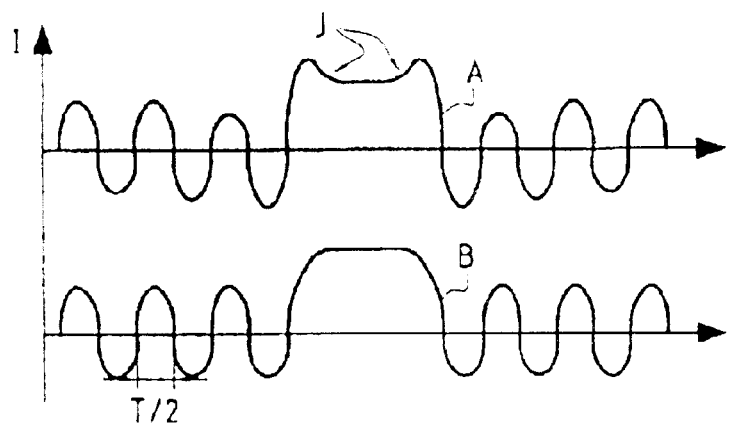
FIG. 3 is a waveform diagram showing how the magnetic induction varies during movement of an encoder, respectively with and without the subject matter of the invention.

An examination of FIG. 3 shows the advantage of implementing correction means 3. FIG. 3 is a waveform diagram showing how the magnetic induction field I in gauss varies, and more precisely showing the component of the magnetic signal that is perpendicular to the surface of the encoder as a function of the angular position of the encoder 1 relative to the detector cell. Curve A shows how the magnetic induction I varies for an encoder that does not have correction means 3 in accordance with the invention, while curve B shows how the magnetic induction I varies for an encoder 1 that is fitted with correction means 3 in accordance with the invention. As can be seen in this figure, the presence of the irregular pole Pi influences the magnetic induction field of the adjacent poles. It can thus be seen in curve A that both the amplitude and the phase of the induction drift, and that the amount of drift increases with increasing proximity of the regular pole to the irregular pole. This gives rise to a phase shift in the induction signal. Examining curve B shows that the magnetic induction created by the irregular pole Pi does not disturb the magnetic induction field of the adjacent regular poles. The signal giving the change in the intensity of the magnetic field delivered by the regular pole adjacent to the irregular pole Pi is symmetrical about the zero or null value of the magnetic field. Such symmetry in the magnetic signal is obtained regardless of the size of the air gap, i.e. the distance between the detector cell 2 and the magnetic ring 1. It turns out that the signal I then presents a period T that is constant even for the regular poles adjacent to the irregular pole. As a result the measurements performed can provide good accuracy concerning identification of the irregular pole.

It should be observed that the means 3 enable the value of the magnetic induction created by the irregular pole Pi to be corrected in such a manner as to prevent it from disturbing the induction from the adjacent poles, while nevertheless allowing it to be detected by a measurement cell 2. The means 3 are therefore adapted so as to reduce the magnetic flux created by the irregular pole while nevertheless maintaining it at a value that is sufficient to enable it itself to be detected.

In accordance with the invention, the correction means 3 are constituted by suitably designing or selecting the area 4 of the irregular pole Pi in question in the travel plane of the encoder 1 relative to the measurement cell 2. It should be observed that the thickness of the irregular pole Pi is constant. This area 4 of the irregular pole Pi is surrounded by a pole 5 linking it with the adjacent poles Pa. This link pole 5 has the same sign or polarity as the adjacent poles Pa, i.e. the sign opposite that of the irregular pole Pi. As can be seen in FIG. 2, the area 4 constituting the irregular pole Pi is surrounded by a magnetic area of opposite sign. The area 4 of the irregular magnetic pole Pi is adapted so that the component of the magnetic signal that is perpendicular to the surface of the encoder and that is generated as the adjacent poles Pa travel past does not include a point of inflection. Thus, as can be seen in FIG. 3, curve A has two points of inflection J corresponding to the passages of the adjacent poles Pa. The presence of such points of reflection J makes differential mode detection impossible. However, curve B which shows the component of the magnetic signal perpendicular to the surface of the encoder 1 in accordance with the invention reveals that the irregular pole Pi, when made in the manner described above, does not give rise to points of inflection due to the passages of the adjacent poles Pa.

The area 4 of the irregular pole Pi is preferably defined relative to each adjacent pole Pa by a sharp transition line $4_1$. In other words, the area 4 is contiguous with each adjacent pole Pa across a transition line $4_1$ which is parallel to the other junction lines between the south poles S and the north poles N. As explained above, each transition line $4_1$ is set back from the sides of the encoder 1 so that the area 4 is completely surrounded by a magnetic area of opposite sign.

In the embodiment shown in FIG. 2, the area 4 is of varying width from one transition line $4_1$ to the other. In this example, the width of the area 4 of the irregular pole increases and then decreases going from one transition line $4_1$ to the other, and it preferably increases and decreases progressively from one transition line to the other. Also preferably, the area 4 of the irregular pole presents a transverse axis of symmetry t with the width of the area 4 on either side thereof decreasing progressively to each of the transition lines $4_1$. Furthermore, in the example shown, the area 4 of the irregular pole also has a longitudinal axis symmetry S along which the width of the area 4 varies. Thus, as can be seen in FIG. 2, the area 4 is of a shape representing the section of two truncated cones having their larger bases touching each other.

According to a preferred characteristic, the angular extent 1a of each adjacent pole is smaller than the angular extent 1 of the other poles having the same sign.

Figure 4:
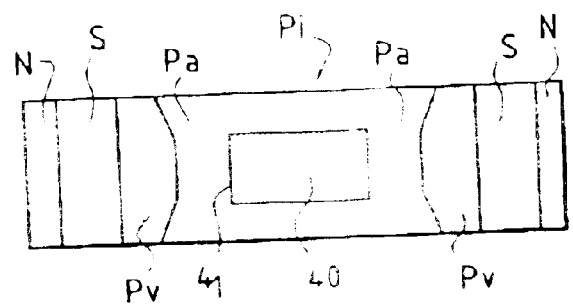
FIG. 4 shows another embodiment of an encoder in accordance with the invention.

In another embodiment, as shown in FIG. 4, the area 4 of the irregular pole Pi is of substantially constant width from one transition line $4_1$ to the other. In addition, in order to decrease the magnetic field in the vicinity of the adjacent pole Pa, the area 40 of each pole Pv neighboring an adjacent pole Pa is smaller than the normal area of the other poles. In the example shown, each neighboring pole Pv beside an adjacent pole Pa possesses a transition line whose central region is in the form of a straight line which is extended at each end by respective sloping portions going away from the area 4 constituting the irregular pole.

Figure 5:
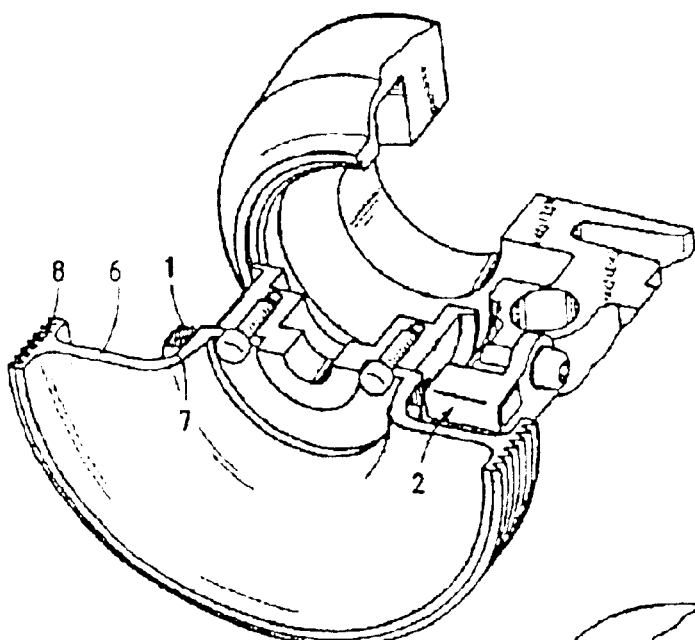
FIG. 5 shows one way in which an encoder of the invention can be mounted.
Figure 6:
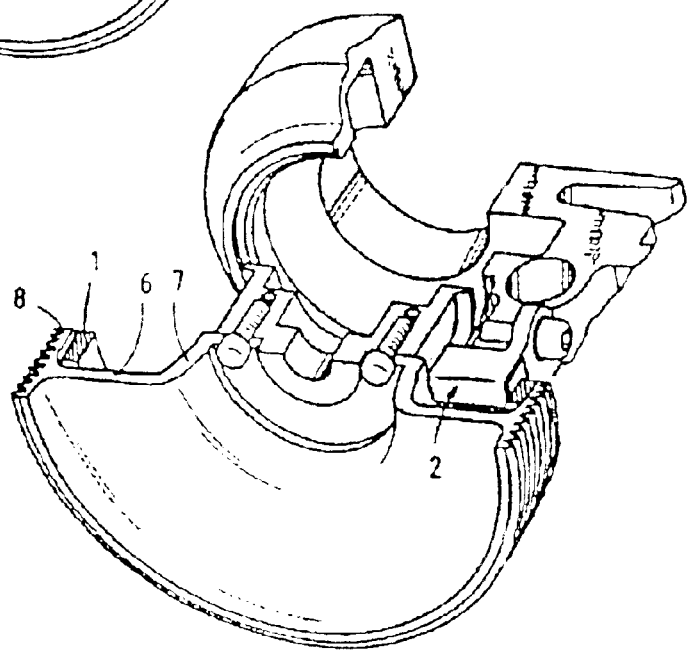
FIG. 6 shows another way in which an encoder of the invention can be mounted.

The encoder 1 of the invention as described above is for mounting on a rotating target in the broad sense, and from which at least one position is to be determined. According to a preferred characteristic, the encoder 1 of the invention is for mounting on a drive pulley mounted at the outlet from a motor vehicle engine, i.e. on a distribution pulley or on one of the auxiliary pulleys. According to an advantageous characteristic, and as shown in FIGS. 5 and 6, the encoder 1 is mounted on the drive pulley 6 that is on the crankshaft so as to enable the ignition top dead-center point corresponding to one of the cylinders to be detected. In the example shown, the encoder 1 is mounted on the radially inner wall or hub 7 (FIG. 5) or on the radially outer wall 8 (FIG. 6) of a driving pulley 6. The elasto-ferrite ring of the encoder 1 is mounted directly on the pulley 6 whose radial wall constitutes the support ring, or else it is mounted indirectly via a support ring which is fixed by any appropriate means to the pulley. As can be seen in FIGS. 5 and 6, a detector cell 2, e.g. a Hall effect cell or a magneto-resistive cell is mounted in the setback defined between the outer and inner radial walls 8 and 7 of the pulley so as to enable the encoder 1 to travel past the cell, thereby together forming a position sensor.

In the embodiment shown above, the position sensor comprises as driving pulley a crankshaft pulley having a magnetic ring adapted to identify a single position. It should be observed that the invention can also be applied to making a sensor having a magnetic ring 1 provided with a plurality of irregular poles Pi enabling a plurality of positions to be identified. Advantageously, the magnetic ring 1 can have four irregular poles Pi, for example, thus making it possible to identify positions relating to four cylinders in an engine. Under such circumstances, the encoder 1 is secured to the cam shaft of a motor vehicle engine. Naturally, the encoder 1 can be mounted on the cam shaft even if it has only one irregular pole.

According to a preferred characteristic, the encoder 1 of the invention is designed to be mounted inside a support plate for a dynamic sealing gasket of a transmission shaft extending between the crankshaft and the gearbox in a motor vehicle engine assembly. The encoder 1 is rotated by the transmission shaft and is mounted close to at least one detector cell 2 mounted on the plate supporting the sealing gasket, thereby constituting a position sensor.

According to another preferred characteristic, the encoder 1 of the invention is constrained to rotate with a shaft of a motor vehicle engine or is rotated by the crankshaft or the cam shaft of a motor vehicle engine, while being mounted inside the cylinder block of such an engine, in close proximity to a detector cell 2 in order to constitute a position sensor.

The invention is not limited to the examples described and shown, since numerous modifications can be made without going beyond the ambit of the invention.

What is claimed is:

1. An encoder for a position sensor, the encoder being of the type comprising a multipole magnetic ring provided on its circumference with alternating north poles and south poles for traveling past a measurement cell that delivers a periodic signal corresponding to variation in the intensity of the magnetic field delivered by the poles, at least one of said poles of a determined sign being an "irregular" pole and comprising between the two opposite-sign poles adjacent thereto, firstly a spacing that is different from the spacing pitch between the other poles, and secondly means for correcting the value of its magnetic field so that the magnetic signal delivered by the passage of the poles adjacent to said irregular pole is symmetrical about the null value of the magnetic field;

wherein the correction means are made by defining at least the area of the irregular pole which is surrounded by a link pole between the adjacent poles and of the same sign as the adjacent poles, so that the component of the magnetic signal that is perpendicular to the surface of the encoder and that is generated during the passage of the poles adjacent to said irregular pole does not include a point of inflection.

2. An encoder according to claim 1, wherein the area of the irregular pole is defined relative to each adjacent pole by a sharp transition line.

3. An encoder according to claim 2, wherein the area of the irregular pole is of varying width from one transition line to the other.

4. An encoder according to claim 3, wherein the area of the irregular pole increases progressively and decreases progressively going from one transition line to the other.

5. An encoder according to claim 4, wherein the area of the irregular pole presents a transverse axis of symmetry on either side of which said area is of width that decreases progressively going to each transition line.

6. An encoder according to claim 5, wherein the area of the irregular pole also presents a longitudinal axis of symmetry along which the width of said area varies.

7. An encoder according to claim 1, wherein the poles adjacent to the irregular pole are each of angular extent that is smaller than the angular extent of the other poles having the same sign.

8. An encoder according to claim 1, wherein the width of the area of the irregular pole is constant from one transition line to the other, and wherein the areas of the poles neighboring the adjacent poles are smaller than the areas of the other poles.

9. A position sensor, including at least one multipole magnetic encoder according to claim 1, traveling past at least one detector cell delivering a periodic electrical signal corresponding to the variation in the intensity of the magnetic field generated by the poles.

10. A position sensor according to claim 9, wherein the encoder is constrained to rotate with a shaft of a motor vehicle engine.

11. A position sensor according to claim 9, wherein the encoder is fitted to or forms an integral part of a drive pulley.

12. A position sensor according to claim 11, wherein the drive pulley is a crankshaft pulley.

13. A position sensor according to claim 11, wherein the drive pulley is a cam pulley.

14. A position sensor according to claim 9, wherein the encoder is mounted inside a support plate for a dynamic sealing gasket mounted between the crankshaft and the gearbox in a motor vehicle engine unit.

15. A position sensor according to claim 9, wherein the encoder is rotated by the crankshaft or the cam shaft, being mounted inside the cylinder block of a vehicle engine.

* * * * *